United States Patent
Jacob

(10) Patent No.: US 9,739,678 B2
(45) Date of Patent: *Aug. 22, 2017

(54) PRESSURE MEASUREMENT DEVICE WITH AUTOMATIC POSITION CORRECTION

(71) Applicant: VEGA GRIESHABER KG, Wolfach (DE)

(72) Inventor: Joern Jacob, Wolfach/Kirnbach (DE)

(73) Assignee: VEGA GRIESHABER KG, Wolfach (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/092,381

(22) Filed: Apr. 6, 2016

(65) Prior Publication Data

US 2016/0231188 A1 Aug. 11, 2016

Related U.S. Application Data

(63) Continuation of application No. 14/563,557, filed on Dec. 8, 2014, now Pat. No. 9,341,531.

(30) Foreign Application Priority Data

Feb. 7, 2014 (DE) .................... 10 2014 101 573

(51) Int. Cl.
*G01L 9/12* (2006.01)
*G01L 9/00* (2006.01)
(Continued)

(52) U.S. Cl.
CPC .............. *G01L 9/0072* (2013.01); *G01L 9/12* (2013.01); *G01L 19/0092* (2013.01); *G01L 19/02* (2013.01)

(58) Field of Classification Search
CPC ....... G01L 9/0072; G01L 9/12; G01L 9/0092; G01L 9/02; G01L 13/025; G01L 7/00
(Continued)

(56) References Cited

U.S. PATENT DOCUMENTS

| | | | | |
|---|---|---|---|---|
| 9,341,531 B2* | 5/2016 | Jacob | ........................ | G01L 9/12 |
| 2010/0154552 A1* | 6/2010 | Miyashita | ............... | G01L 19/02 |
| | | | | 73/718 |
| 2013/0305840 A1* | 11/2013 | Saari | ....................... | G01L 19/02 |
| | | | | 73/862.08 |

FOREIGN PATENT DOCUMENTS

CN 101776502 A 7/2010
DE 10 2007 033 040 A1 7/2007
(Continued)

OTHER PUBLICATIONS

Search report from corresponding European patent application 14195036.0, issued Feb. 13, 2015.
(Continued)

*Primary Examiner* — Lisa Caputo
*Assistant Examiner* — Nigel Plumb
(74) *Attorney, Agent, or Firm* — Juneau & Mitchell

(57) ABSTRACT

The invention describes a pressure transducer having a pressure measuring cell, a position sensor, and an analysis device which has at least one signal processing device and a position correction device for the purpose of determining a position error, wherein the at least one position sensor is arranged in a stationary position relative to the pressure measuring cell, and the position sensor is electrically connected to the position correction device, wherein a first signal is provided by the signal processing device, said signal being determined from a signal provided by the pressure measuring cell, wherein a second signal is provided by the position sensor, and wherein an output signal is provided by the position correction device, determined from the first and the second signals.

5 Claims, 1 Drawing Sheet

(51) Int. Cl.
*G01L 19/00* (2006.01)
*G01L 19/02* (2006.01)

(58) Field of Classification Search
USPC .................. 73/718, 717, 716, 715, 700, 724
See application file for complete search history.

(56) References Cited

FOREIGN PATENT DOCUMENTS

| EP | 1 500 528 A1 | 7/2004 | |
|----|--------------|--------|---|
| JP | 2009/085595 A | 9/2007 | |
| WO | WO 2009/101566 A1 | 8/2009 | |
| WO | WO2009101566 A1 * | 8/2009 | ............. G01L 19/00 |

OTHER PUBLICATIONS

Office Action from corresponding Chinese patent application 2015100005245.8, issued Aug. 7, 2016.
Search report attached to the office action of the German Patent Office for related German patent application 10 2014 101 573.8, issued Jan. 4, 2014.

* cited by examiner

# PRESSURE MEASUREMENT DEVICE WITH AUTOMATIC POSITION CORRECTION

CROSS REFERENCE TO RELATED APPLICATIONS

This patent application claims priority to German Patent Application 10 2014 101 573.8, filed on Feb. 7, 2014.

STATEMENT REGARDING FEDERALLY SPONSORED RESEARCH OR DEVELOPMENT

No federal government funds were used in researching or developing this invention.

NAMES OF PARTIES TO A JOINT RESEARCH AGREEMENT

Not applicable.

SEQUENCE LISTING INCLUDED AND INCORPORATED BY REFERENCE HEREIN

Not applicable.

BACKGROUND

Field of the Invention

The present invention relates to a pressure measurement device with automatic position correction, and a method for determining pressure related thereto.

Background of the Invention

When pressure measurement devices are used to measure pressure, a so-called position error always results from the installation position of the pressure measurement device, said position error being incorporated as an error in the measurement of the pressure as a result of the orientation of the pressure measuring cell. This error arises as a result of the fact that, depending on the installation position, the weight of the measurement membrane itself, or—in the case of oil-submerged systems, the hydrostatic pressure of the oil in front of the measurement membrane as well—is measured together with the pressure being measured. In the case of ceramic capacitive measuring cells, this error—at 0.2 mbar, by way of example—is relatively small, but can significantly exceed the measurement precision of the device in cases where the measurement ranges are small—by way of example in the region of 100 mbar.

In the case of systems with a diaphragm seal, this error is generally larger. By way of example, an oil-submerged system can have a position error of up to several millibar depending on the distance of the diaphragm seal to the measuring element. The height of the oil column is the decisive factor in this case. As such, for an oil fill height of 5 cm, and an oil density of 0.8 g/cm$^3$, a maximum position error is found by doubling the height of the filled oil, multiplied by the density of the oil and the acceleration due to gravity of 9.81 m/s$^2$, giving a value of 7.8 mbar. The multiplication factor of 2 stems from the fact that if the measurement membrane is oriented facing the direction of the earth's gravity, the weight of the oil column on the measurement membrane creates pressure, whereas the measurement membrane oriented in the opposite measurement direction deflects the weight of the oil column in the opposite direction.

In general, all pressure measurement devices are calibrated in the installation position where the membrane faces downward toward the earth's gravity. However, installation at the customer site occurs in all possible installation positions, and only very rarely in the same installation position as the calibration. As a result, the customer must undertake a position correction manually. For this purpose, a corresponding operation function in the device, the same installed at zero pressure, must be carried out. In the process, the zero point is accordingly corrected. In the case of relative pressure devices, the device shows 0 mbar afterward. In the case of absolute pressure devices, it is not possible to correct the position so simply, because the device must be entirely evacuated for the position of the device to be corrected, or the exact ambient pressure must be known, and this can most often only be determined with a reference device. Both of these things are associated with a great additional expenditure of time and effort for the customer, or are in practice completely impossible from a technical perspective.

Therefore the problem addressed by the invention is that of providing pressure measurement devices which can automatically correct the position error.

This problem is addressed by a pressure transducer and a method for determining pressure, each as disclosed herein. Advantageous embodiments are disclosed in each of the dependent claims.

BRIEF SUMMARY OF THE INVENTION

In a preferred embodiment, a pressure transducer, comprising a pressure measuring cell, at least one position sensor, and an analysis device which comprises at least one signal processing device and a position correction device for the purpose of determining a position error, wherein the at least one position sensor has an immobile arrangement with respect to the pressure measuring cell, and the pressure measuring cell is electrically connected to the signal processing device, and the at least one position sensor is electrically connected to the position correction device, wherein a first signal is provided by the signal processing device, said signal being determined from a signal provided by the pressure measuring cell, wherein a second signal is provided by the position sensor, and wherein an output signal is provided by the position correction device, determined from the first and the second signals.

In another preferred embodiment, the pressure transducer as described herein, wherein the pressure measuring cell has a pressure-sensitive surface which is a membrane, wherein the pressure measuring cell is preferably a capacitive pressure measuring cell.

In another preferred embodiment, the pressure transducer as described herein, wherein the least one position sensor is attached on the pressure measuring cell by means of a fixing means.

In another preferred embodiment, the pressure transducer as described herein, wherein at least one position sensor is an acceleration sensor.

In another preferred embodiment, the pressure transducer as described herein, wherein the pressure measuring cell has at least two position sensors which are arranged relative to each other in such a manner that the angle of inclination between the direction of the earth's gravity and the direction of the pressure-sensitive surface of the pressure measuring cell can be determined in each inclination direction of the pressure measuring cell.

In another preferred embodiment, the pressure transducer as described herein, wherein the output signal and/or the first signal and/or the second signal is electrically connected to a radio device.

In another preferred embodiment, a method for determining pressure by means of a pressure transducer as described herein, having the following method steps: a) measuring a pressure acting on the pressure measuring cell, and relaying the measurement signal generated by the pressure measuring cell to a signal processing device, b) generating a first signal from the measurement signal in the signal processing device and relaying the generated first signal to a position correction device, c) determining a position of the pressure measuring cell relative to an original position of the pressure measuring cell by means of a position sensor which has an arrangement which is immobile with respect to the pressure measuring cell, generating a second signal from the determined position, by means of the position sensor, and relaying the second signal generated by the position sensor to the position correction device, d) determining a corrected output signal from the first signal and the second signal in the position correction device and providing the corrected output signal.

In another preferred embodiment, the method as disclosed herein wherein a position error is determined from the second signal by means of a characteristic curve saved in the position correction device or by means of a correction algorithm or correction value saved in the position correction device.

In another preferred embodiment, the method as disclosed herein wherein the original position is determined by the pressure-sensitive surface of the pressure measuring cell being oriented downward, facing the direction of the earth's gravity, and the pressure measuring cell being calibrated in the original position, preferably prior to the first step of the method.

In another preferred embodiment, the method as disclosed herein further comprising wherein a maximum position error is determined from the difference between the measured pressure of the pressure measuring cell in the original position and the measured pressure of the pressure measuring cell in a position of the pressure measuring cell which is rotated 180 degrees with respect to the original position.

In another preferred embodiment, the method as disclosed herein further comprising wherein an orientation angle is determined which is obtained from the angle between the original position and a current direction of the pressure-sensitive surface, and the position error is determined as a function of the orientation angle from the value which is obtained if half of the value of the maximum position error, multiplied by the cosine of the orientation angle, is subtracted from half of the value of the maximum position error.

In another preferred embodiment, the method as disclosed herein wherein the output signal and/or the second signal is/are saved, preferably as a function of time.

DETAILED DESCRIPTION OF THE INVENTION

Figure 1:
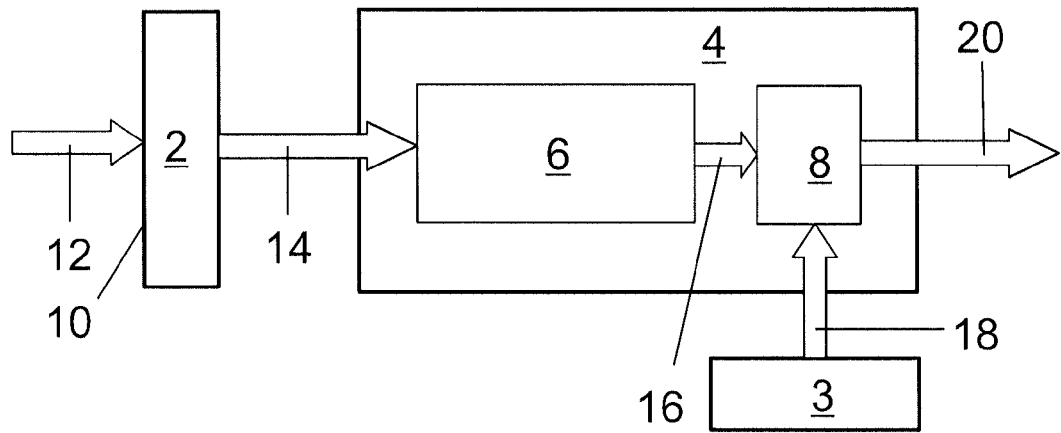
FIG. 1 is a line drawing evidencing one example of a pressure transducer.

The pressure transducer according to the invention has a pressure measuring cell, at least one position sensor, and an analysis device which has at least one signal processing device, as well as a position correction device for the purpose of determining a position error. The at least one position sensor in this case is arranged in a stationary position relative to the pressure measuring cell, and the pressure measuring cell is electrically connected to the position correction device. The at least one position sensor is electrically connected to the position correction device, wherein a first signal is provided by the signal processing device, said signal being determined from a signal provided by the pressure measuring cell, wherein a second signal is provided by the position sensor, and wherein an output signal is provided by the position correction device, determined from the first and the second signals. It is possible to correct the position error resulting from the installation position by means of such a pressure transducer.

The at least one position sensor is advantageously attached on the pressure measuring cell by means of a fixing means—by way of example an adhesive, a bolt connection, or a weld or solder connection—or is directly integrated into the same. In this way, the relative position of the position sensor with respect to the pressure measuring cell on or in the pressure measuring cell is already fixed, such that the pressure measuring cell can be retailed as an independent, fully implemented unit together with the fixed position sensor.

The at least one position sensor is preferably an acceleration sensor. An acceleration sensor enables the measurement of movement forces which act on the pressure measuring cell, and can also register sudden movements or impacts, by way of example, which affect the pressure measuring cell, such that, when such sudden movement forces are recorded, it is possible to determine by working backwards whether the pressure measuring cell has fallen to the ground or has been subjected to other impacts. If these events are documented, it is then possible to deduce the cause of malfunctions which arise, and to determine, using such a protocol, whether a warranty claim can be made or not, by way of example.

The pressure measuring cell advantageously has at least two position sensors which are arranged relative to each other in such a manner that the angle of inclination between the direction of the earth's gravity and the direction of the pressure-sensitive surface of the pressure measuring cell—for example the membrane—can be determined in any inclination direction of the pressure measuring cell. The pressure measuring cell in this case is advantageously a capacitive pressure measuring cell, and the pressure-sensitive surface is preferably a membrane.

In one of the embodiments according to the invention, the output signal can be electrically connected to a radio device and communicate via the same. The first and/or the second signals can also be electrically connected to a radio device. A radio device enables wireless communication, by way of example between the analysis device and/or the position sensor—the same preferably being designed as an inclination sensor—and the pressure measuring cell, and/or between the pressure transducer and a plant periphery at a distance from the pressure transducer. This can be practical in cases where, due to external environmental conditions, such as very high pressures, high temperatures, aggressive atmospheres, or the like, by way of example, a radio device is prioritized over an electrical connection.

The method according to the invention for determining pressure by means of such a pressure transducer has the following method steps: first, the pressure acting on the pressure measuring cell is measured, and the measurement signal generated by the pressure measuring cell is relayed to a signal processing device. Next, in the signal processing device, a first signal is generated from the measurement signal and relayed to a position correction device. In parallel with this step, or before or after the same, the position of the pressure measuring cell relative to an original position of the pressure measuring cell can be measured and determined by means of a position sensor which has an immobile arrangement relative to the pressure measuring cell. For this purpose, a second signal can be generated by the position sensor from the determined position, and relayed to the position correction device. If the position correction device is furnished with both the first and the second signals, a corrected output signal can be determined from these two signals and be made available for further processing. The output signal then passes on the reported pressure value—by way of example to a display device or another device.

A position error can optionally also be determined from the second signal by means of a characteristic curve saved in the position correction device, or by means of a correction algorithm or correction value—for example in the form of a correction table—saved in the position correction device, from the relative position of the pressure measurement sensor.

The original position is advantageously determined, in a first method step, by orienting the pressure-sensitive surface of the pressure measuring cell downward, facing the direction of the earth's gravity, and determining the pressure acting on the membrane in this position. The pressure measuring cell can—preferably at the beginning of the method—advantageously be calibrated prior to its ultimate installation in this original position, such that the pressure can be corrected following the ultimate installation, in an installed position which is different from the original position, by means of relatively simple correction means included in the position correction device.

A maximum position error is preferably determined from the difference between the measured pressure of the pressure measuring cell in the original position, described further above—that is, in the position in which the pressure-sensitive surface of the pressure measuring cell faces downward in the direction of the earth's gravity, and the measured pressure of the pressure measuring cell in a position of the pressure measuring cell which is rotated 180° with respect to the original position. In this way, both the minimum pressure acting on the pressure measuring cell and the maximum pressure acting on the pressure measuring cell are determined at identical ambient conditions, and the maximum position error is determined as a result.

The angle between the preferred original position—that is, the direction in which earth's gravity acts—and a current direction—that is, a direction in which the pressure-sensitive surface of the pressure measuring cell is facing—is the so-called orientation angle. The position error can be determined as a function of this orientation angle—for example from the value which is obtained if half of the value of the maximum position error, multiplied by the cosine of the orientation angle is subtracted from half of the value of the maximum position error. This relationship between the orientation angle and the position error enables, in many cases, the exact determination of the pressure acting on the cell, regardless of the current direction in which the pressure-sensitive surface—that is, by way of example, the membrane—of the pressure measuring cell is facing. The angle is determined via the position sensor, and the described relationship can be saved as a characteristic curve or as a correction algorithm, by way of example, in the position correction device.

In one preferred embodiment, the output signal and/or the second signal can be saved, preferably as a function of time. It is possible to test, by way of example—particularly if the position sensor is designed as an acceleration sensor—whether an event which justifies a warranty claim has occurred when a malfunction arises, by reading such a memory in which the individual events are preferably recorded as a function of time. By way of example, if the pressure transducer has particularly fallen to the ground during the operation, or has been damaged by an impact, the acceleration sensor can detect an abrupt deceleration process, which—if it is recorded in a memory, and preferably in a non-volatile memory—can document this event. If the pressure transducer has its own voltage or current supply, which also supplies the pressure transducer with power during transport of the same, it is even possible to detect and document damage during transport.

DETAILED DESCRIPTION OF THE FIGURES

FIG. 1 shows a pressure transducer 1 which has a pressure measuring cell 2, a position sensor 3, and an analysis device 4. The analysis device 4 has a signal processing device 6 and a position correction device 8. The pressure measuring cell 2 is electrically connected to the signal processing device 6. The position sensor 3 is electrically connected to the position correction device 8. If a pressure 12 is exerted on the membrane 10 of the pressure measuring cell 2, a pressure measuring cell signal 14 is relayed from the pressure measuring cell 2 to the signal processing device 6. The signal processing device 6 arranged in the analysis device 4 generates a first signal 16 therefrom, which is relayed to the position correction device. The position sensor 3 measures the position of the pressure measuring cell 2 relative to the direction of the earth's gravity and relays this position in the form of a second signal 18 to the position correction device 8, which generates an output signal 20 from the first signal 16 and the second signal 18, wherein said output signal 20 provides the actual pressure 12 acting on the pressure measuring cell 2.

Figure 2:
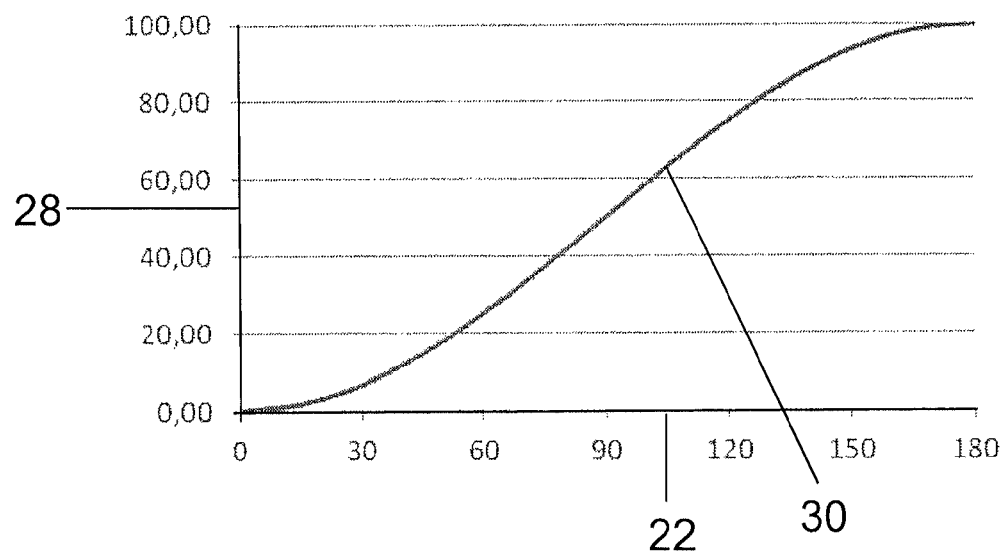
FIG. 2 is a line drawing evidencing one possible relationship between an installation angle relative to the direction of the earth's gravity and a position error determined therefrom.

FIG. 2 shows a characteristic curve which provides the position error 28 as a percentage according to the orientation angle 22 in degrees, derived from the orientation angle 22 between an original position 24 which faces in the direction of the earth's gravity, and a current position 26 in which the membrane 10 is facing. The relationship between the orientation angle 22 and the position error 28 is determined by a curve 30 which, by way of example, can be saved in the position correction device 8 as a characteristic curve, and corrects the first signal 16 with the position information transported by the second signal 18.

For a maximum position error $F_{Lage,max}$ of 100%, which is determined from the difference between the measured pressure of the pressure measuring cell 2 in the original position and the measured pressure 12 of the pressure measuring cell 2 in a position of the pressure measuring cell 2 which is rotated 180° with respect to the original position, the position error 28 $F_{Lage}$ is found, by way of example, according to the orientation angle 22 α between the original position 24 and the direction 26 in which the membrane surface 10 of the pressure measuring cell 2 is facing, as half of the maximum position error minus half of the maximum position error multiplied by the cosine of the orientation angle:

$$F_{Lage} = \frac{F_{Lage,max} - F_{Lage,max} \times \cos(\alpha)}{2}$$

Figure 3:
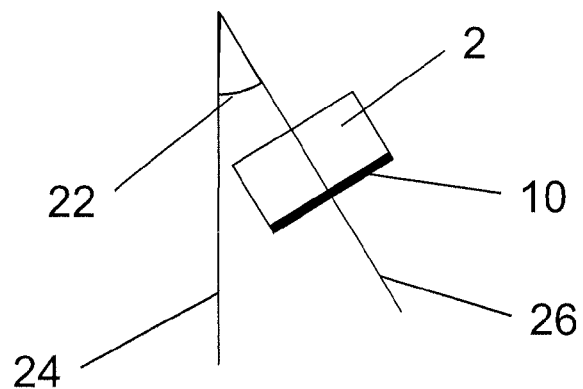
FIG. 3 is a line drawing evidencing a pressure measuring cell which is arranged relative to the original position at an orientation angle α.

FIG. 3 shows how the pressure measuring cell 2 is oriented with respect to the original position 24, and the orientation angle 22 determined between the current direction 26 of the pressure measuring cell 2 and the original position 24.

LIST OF REFERENCE NUMBERS

1 pressure transducer
2 pressure measuring cell
3 position sensor
4 signal processing, analysis device
6 signal processing device
8 position correction device
10 pressure-sensitive surface, membrane
12 pressure
14 pressure measuring cell signal
16 first signal
18 second signal
20 output signal
22 orientation angle
24 original position
26 current direction
28 position error
30 curve The references recited herein are incorporated herein in their entirety, particularly as they relate to teaching the level of ordinary skill in this art and for any disclosure necessary for the commoner understanding of the subject matter of the claimed invention. It will be clear to a person of ordinary skill in the art that the above embodiments may be altered or that insubstantial changes may be made without departing from the scope of the invention. Accordingly, the scope of the invention is determined by the scope of the following claims and their equitable equivalents.

I claim:

1. A pressure transducer, comprising a pressure measuring cell, at least one position sensor, and an analysis device which comprises at least one signal processing device and a position correction device for the purpose of determining a position error, wherein the at least one position sensor has an immobile arrangement with respect to the pressure measuring cell, and the pressure measuring cell is electrically connected to the signal processing device, and the at least one position sensor is electrically connected to the position correction device, wherein a first signal is provided by the signal processing device, said signal being determined from a signal provided by the pressure measuring cell, wherein a second signal is provided by the position sensor, and wherein an output signal is provided by the position correction device, determined from the first and the second signals, wherein at least one position sensor is an acceleration sensor, wherein said pressure transducer has a memory in which the individual events of said second signal are recorded, and wherein said pressure transducer has its own voltage or current supply, which also supplies said pressure transducer with power during transport of the same.

2. The pressure transducer of claim 1, wherein the pressure measuring cell has a pressure-sensitive surface which is a membrane, wherein the pressure measuring cell is preferably a capacitive pressure measuring cell.

3. The pressure transducer of claim 1, wherein the least one position sensor is attached on the pressure measuring cell by means of a fixing means.

4. The pressure transducer of claim 1, wherein the pressure measuring cell has at least two position sensors which are arranged relative to each other in such a manner that the angle of inclination between the direction of the earth's gravity and the direction of the pressure-sensitive surface of the pressure measuring cell can be determined in each inclination direction of the pressure measuring cell.

5. The pressure transducer of claim 1, wherein the output signal and/or the first signal and/or the second signal is electrically connected to a radio device.

* * * * *